UNITED STATES PATENT OFFICE.

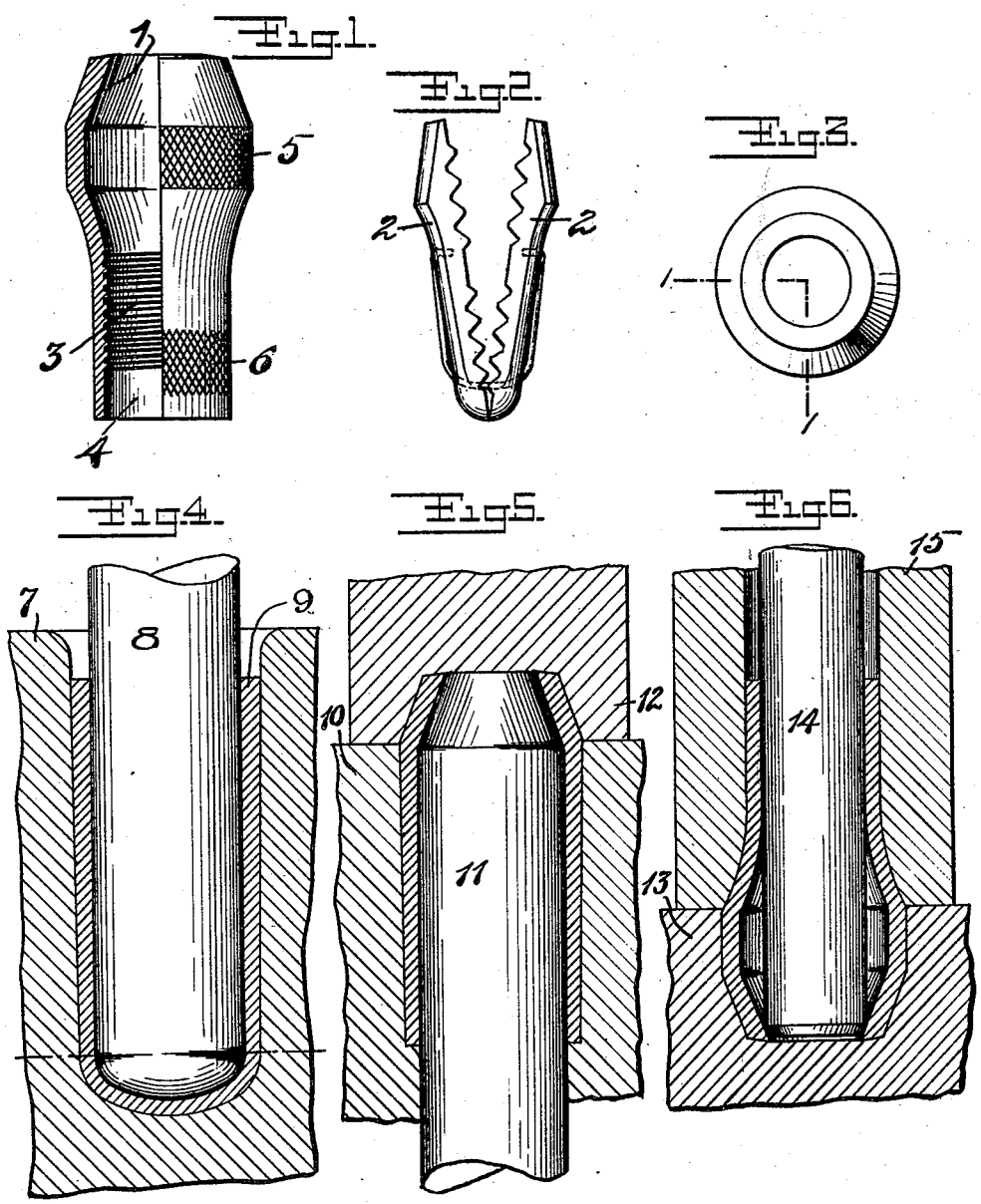

FRANK J. MORAN, OF NEW BRITAIN, CONNECTICUT, ASSIGNOR TO THE MOSEL MANUFACTURING COMPANY, OF KENSINGTON, CONNECTICUT, A CORPORATION OF CONNECTICUT.

CHUCK SLEEVE FOR BIT BRACES, ETC., AND METHOD OF MANUFACTURING THE SAME.

1,413,926. Specification of Letters Patent. Patented Apr. 25, 1922.

Application filed February 21, 1920. Serial No. 360,334.

*To all whom it may concern:*

Be it known that I, FRANK J. MORAN, a citizen of the United States of America, residing at New Britain, Connecticut, have invented a new and useful Chuck Sleeve for Bit Braces, Etc., and Methods of Manufacturing the Same, of which the following is a specification.

My invention relates to chuck sleeves for bit braces and the like.

My invention has for its object the manufacture of such articles from sheet or wrought metal in such a manner that the finished articles are of superior quality. Futhermore, the method of manufacture is such that the same may be very rapidly produced at a minimum of expense and with practically no wastage or loss. To the best of my knowledge, such articles have heretofore always been made from cast metal, in fact the very unusual shape of the article is such as to discourage any attempt to make it of any other material. I have however solved the problem and I am now able to successfully produce them from sheet metal. I shall hereinafter show wherein my new method of manufacture, and the finished article itself, constitutes a great advance in the art.

In the drawings:

Fig. 1, is a side elevation of the finished article, a quarter section being removed on the plane of the line 1—1 of Fig. 3.

Fig. 2, is a side elevation of chuck jaws of the conventional type employed with chuck sleeves.

Fig. 3, is an end elevation of the completed chuck sleeve.

Figs. 4, 5 and 6 are conventional illustrations of certain steps in the process of manufacture.

Fig. 1 shows the finished article, the cross-sectional portion showing the interior contour. It will be observed that the outer end is contracted so as to provide a central opening of relatively restricted diameter, while immediately back of this opening is provided what I will term a tapered jaw contracting wall 1. 2—2 represent chuck-jaws of conventional form. The forward inclined side walls of the jaws are engaged by said jaw contracting wall 1, so that when the sleeve is screwed down, the jaws will be forced toward each other in the usual manner to properly grip a tool between them. Inasmuch as the rotatable wall 1 must rub on the non-rotatable jaws 2—2, it follows that the surface of this wall should be very smooth and dense to avoid friction and wear, and to also permit relatively easy action inasmuch as ordinarily only the hand is used to tighten up chucks of this type. Directly back of the wall 1, there is a relatively large annular cavity within the sleeve which affords room for the offset parts of the jaws 2—2. Back of this enlarged cavity, the sleeve is relatively reduced in diameter, and is provided with an internal thread 3. The extreme inner end of the threaded portion of the bore is preferably slightly counterbored as indicated at 4. 5 is a knurling usually provided around the sleeve at its greater diameter to afford a good hand grip, and 6 represents a second knurled portion usually found on finished chuck sleeves of this type.

In the preferred manner of carrying out my invention, I take a plate of wrought or sheet metal of the proper size and thickness, and subject it to a drawing process in suitable dies, so as to convert it into the form of a cup substantially as shown in Fig. 4 in which 7 represents the die, 8 the mandrel co-operating therewith, and 9 the side walls of said cup. It may be necessary to resort to two or more drawing steps to reduce the cup to the desired final diameter, which diameter should correspond to the maximum diameter of the finished article. By making the die 7 slightly tapered, the outer end of the cup wall may be made somewhat thicker than the inner end, so that the wall of the finished article at its outer end will be thicker than the wall at the inner end as is sometimes preferred. The lower end of the cup is then punched out or cut off so as to form an open ended tube. This tube may be produced in any desired manner but I prefer to draw it up from sheet metal.

I then proceed to shape up the article by taking the tube and placing it in a proper holder, conventionally indicated at 10 and inserting a mandrel 11 into the tube in the manner indicated in Figure 5. This mandrel has a smooth tapered end which corresponds externally to the desired shape and pitch of the inner jaw contracting wall 1 of the finished chuck sleeve. The tube is held in such a position that a portion of the same projects above the holder 10. A die 12 is then applied to the said exposed end so as to draw in the sides in the manner shown in Fig. 5. The pressure of the die 12 crowds the metal hard against the tapered end of the mandrel 11 and forms at once a smooth hard wall of the desired pitch, and of such compactness or density as to wear well and slide freely on the sides of the jaws which are to contact therewith.

The next step comprises transferring the sleeve thus partially finished to another holder 13 (see Fig. 6). This holder has a cavity corresponding to the taper of the outer end of the finished article, and also surrounds that portion of the side walls which is to bear the knurling 5. 14 is a mandrel which is projected into the center of the tube from above, and 15 is a die which is forced down onto the outer side of the exposed end so as to draw in the side walls against the mandrel 14, and thereby reduce the diameter of that part of the sleeve to make it correspond to the shape and size of the finished article.

The aforesaid few drawing operations result in the production of what I may term a blank which corresponds in design and proportions throughout to the design and proportions of the finished article. The external surface requires no machining aside from merely rolling in the knurls 5 and 6, and need only be polished up and plated. No internal machining operation is necessary excepting merely to tap in the thread 3 and make the counterbore 4, if that is desired.

The importance of my invention can best be appreciated by a comparison of the old process and articles produced thereby with my new process and the articles produced thereby. In practicing the old process a metal blank is first formed by casting. The external dimensions of this cast blank are always substantially greater than the external dimensions of the finished chuck sleeve. This cast blank is then subjected to a machining operation to cut away the outer rough surface of the casting, and to reduce the external dimensions to the desired dimensions of the finished article. This turning down of the outside of the casting is a relatively slow and expensive task involving much labor and wear on tools, to say nothing of breakage and waste of metal. The blank after being turned down must then be placed in a proper grinding machine so as to remove all traces of the tool marks. This likewise requires extra labor and time. The cast metal blank is then smoothed up on the inside by proper tools and a reamer must also be introduced to cut away the rough surface of the internal tapered jaw contracting wall and give it the proper shape and pitch. Inasmuch as no reamer can be introduced which is of greater diameter than the internal diameter of the threaded portion, it follows that a relatively small portion only of this tapered wall can be effectively smoothed up, thereby differing greatly from my improved sleeve which has the entire effective surface of the jaw contracting wall smoothed up and compacted (See Fig. 5) so as to move with very little friction on the jaws wherever the points of contact may be.

After the cast metal blanks have been subjected to these various machining operations the same are inspected and, if found free from imperfections, they are then polished and plated. It is taken for granted that in the manufacture of these articles from cast metal blanks there will be a substantial percentage of waste, due to the imperfections inherent in cast metal, and such wastage constitutes a very substantial loss. Inasmuch as imperfections in the cast metal sleeves are seldom detected until after very much, if not all of the machine work has been completed, it follows that such wastage not only involves a substantial loss of material but also a great loss of labor. In contrast therewith, the blanks produced by my improved method are, by reason of the fact that they are formed from sheet metal, bound to be substantially uniform in size, quality and texture and waste is practically eliminated. When they come from the last die they are practically finished save for polishing and plating.

Comparing the finished articles themselves, my new sleeve is stronger than a corresponding article made from cast metal. It is also better by reason of the fact that all of the effective parts of the jaw contracting wall 1 is smoothed up and the texture thereof is so compacted that it will be relatively hard and durable and will work freely on the jaws.

What I claim is:—

1. A method of forming a seamless wrought iron chuck sleeve for a bit brace, comprising first forming a seamless tube, and then subjecting the ends of the tube to drawing pressure to reduce the diameter of both ends thereof, supporting the tube on the inside by a mandrel, one end of which is tapered, the internal wall of the tube adjacent to the tapered end of the mandrel being forced tightly against said tapered end, to smooth and compact the same.

2. A method of forming a seamless wrought iron chuck sleeve for a bit brace, comprising first forming a seamless tube, then subjecting the ends of the tube to drawing pressure to reduce the diameter of both ends thereof, supporting the tube on the inside by a mandrel, one end of which is tapered, the internal wall of the tube adjacent to the tapered end of the mandrel being forced tightly against said tapered end, to smooth and compact the same, then withdrawing said mandrel and threading the inner wall of said tube throughout a portion of its length.

3. The method of forming a chuck sleeve comprising, subjecting a tube to an endwise and sidewise drawing operation to reduce the two ends thereof in diameter to substantially the diameter of the finished article, said drawing operations being applied to one end at a time, the interior of said tube being re-inforced by a mandrel having a tapered shaping end during the first drawing step to assist in shaping the forward end of the sleeve, the interior of said tube being re-inforced during the second drawing step by another mandrel of relatively reduced diameter to assist in forming the rear end of said shell.

4. The method of forming a chuck sleeve, comprising; first, drawing up a cup shaped blank from a sheet of metal; next, cutting off the closed end of the cup to form a tube; next, drawing in the last mentioned end of the tube to form a relatively abrupt contracted portion having a smooth internally tapered annular wall; next, drawing in the opposite end of said tube to form a long tubular portion of reduced diameter relatively to the largest diameter of the sleeve but of relatively larger diameter than the opening through the abruptly contracted portion.

5. The method of forming a chuck sleeve, comprising; first, drawing up a cup shaped blank from a sheet of metal and forming the side wall at the open end thereof of greater thickness than the thickness of the side wall at the closed end thereof; next, cutting off the closed end of the cup to form a tube; next, drawing in the last mentioned end of the tube to form a relatively abrupt internally tapered annular wall; next, drawing in the opposite end of said tube to form a long tubular portion of reduced diameter relatively to the largest diameter of the sleeve but of relatively larger diameter than the opening through the abruptly contracted portion.

FRANK J. MORAN.